No. 852,444. PATENTED MAY 7, 1907.
C. J. MELLIN.
LOCOMOTIVE.
APPLICATION FILED DEC. 5, 1906.
6 SHEETS—SHEET 1.
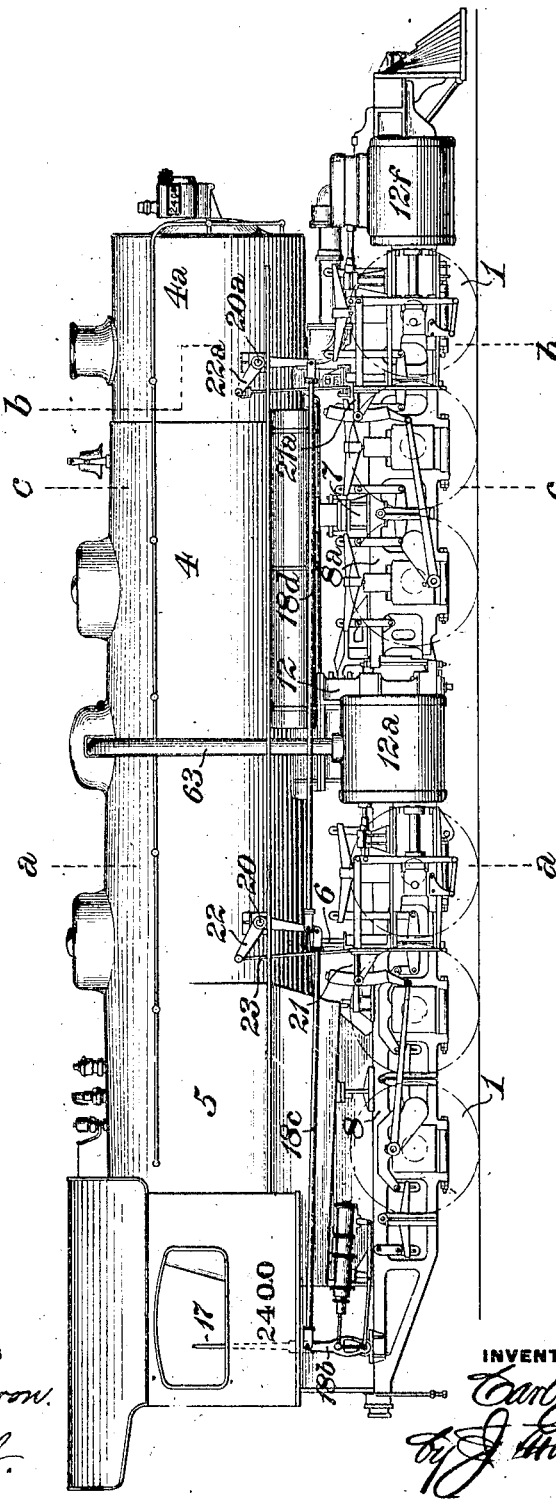
FIG. I.
WITNESSES
James C. Herron.
S. R. Bell.
INVENTOR
Carl J. Mellin
by J. Snowden Bell
Att'y.

No. 852,444. PATENTED MAY 7, 1907.
C. J. MELLIN.
LOCOMOTIVE.
APPLICATION FILED DEC. 5, 1906.

6 SHEETS—SHEET 3.

WITNESSES
James C. Herron.
S. R. Bell.

INVENTOR
Carl J. Mellin
by Jawden Bell
Att'y.

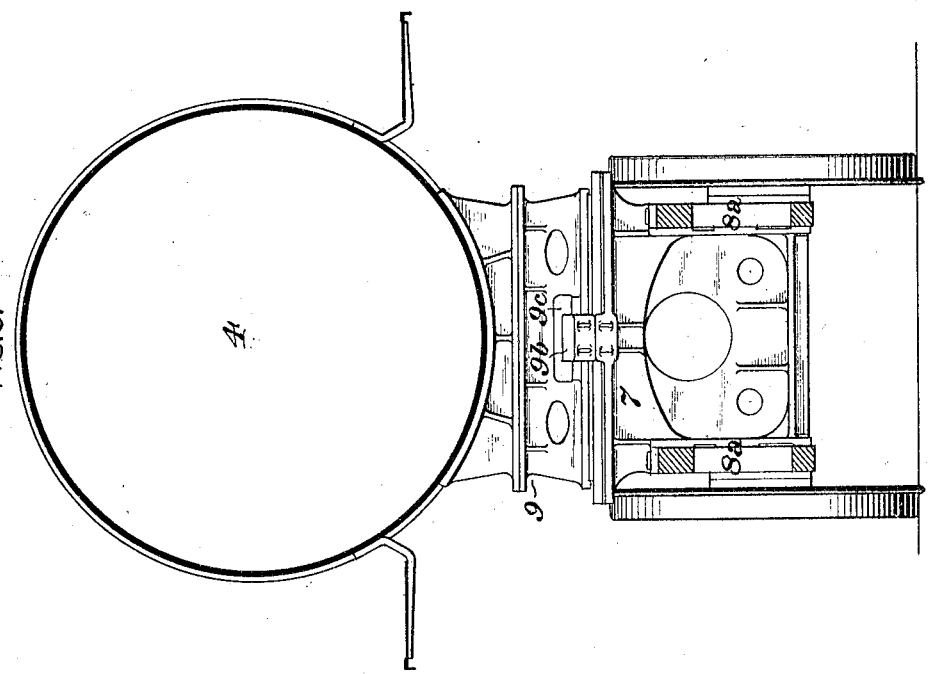
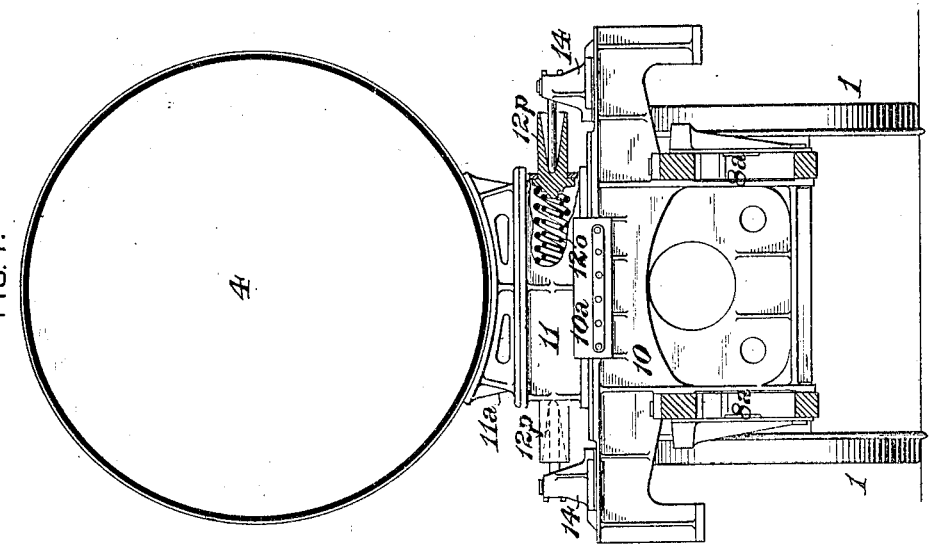

No. 852,444. PATENTED MAY 7, 1907.
C. J. MELLIN.
LOCOMOTIVE.
APPLICATION FILED DEC. 5, 1906.

6 SHEETS—SHEET 4.

WITNESSES
James C. Herron.
S. R. Bell.

INVENTOR
Carl J. Mellin
by Thurston Bell,
Att'y.

No. 852,444. PATENTED MAY 7, 1907.
C. J. MELLIN.
LOCOMOTIVE.
APPLICATION FILED DEC. 5, 1906.
6 SHEETS—SHEET 4.
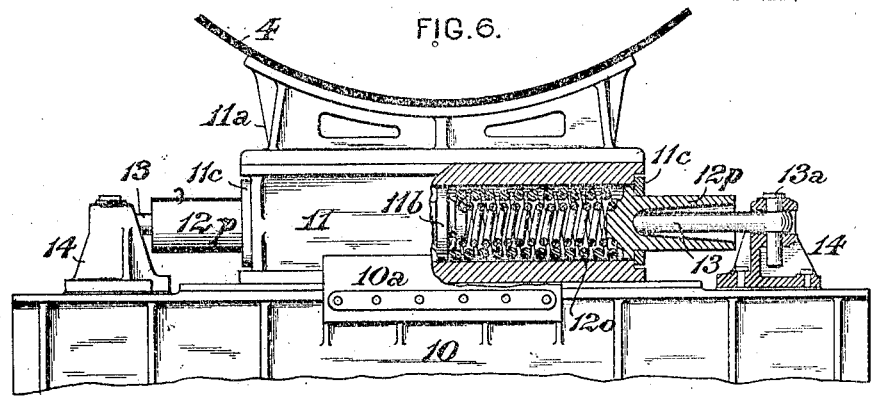
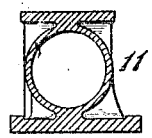
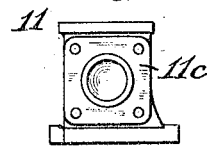
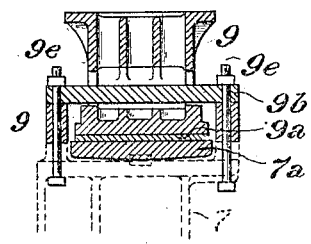
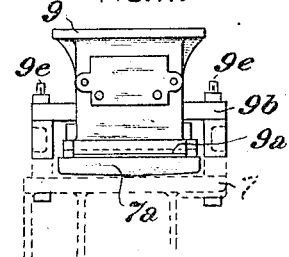
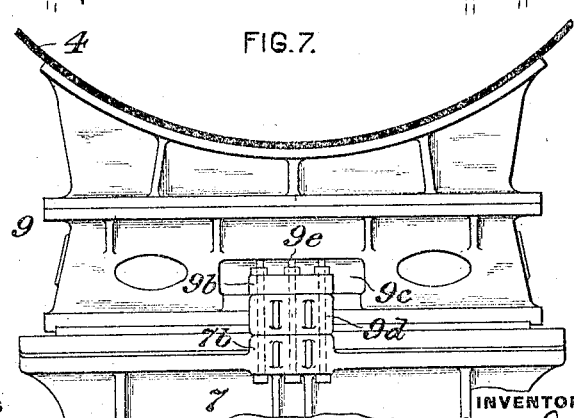
WITNESSES
James C. Herron.
S. R. Bell.
INVENTOR
Carl J. Mellin
by J. Snowden Bell
Att'y.

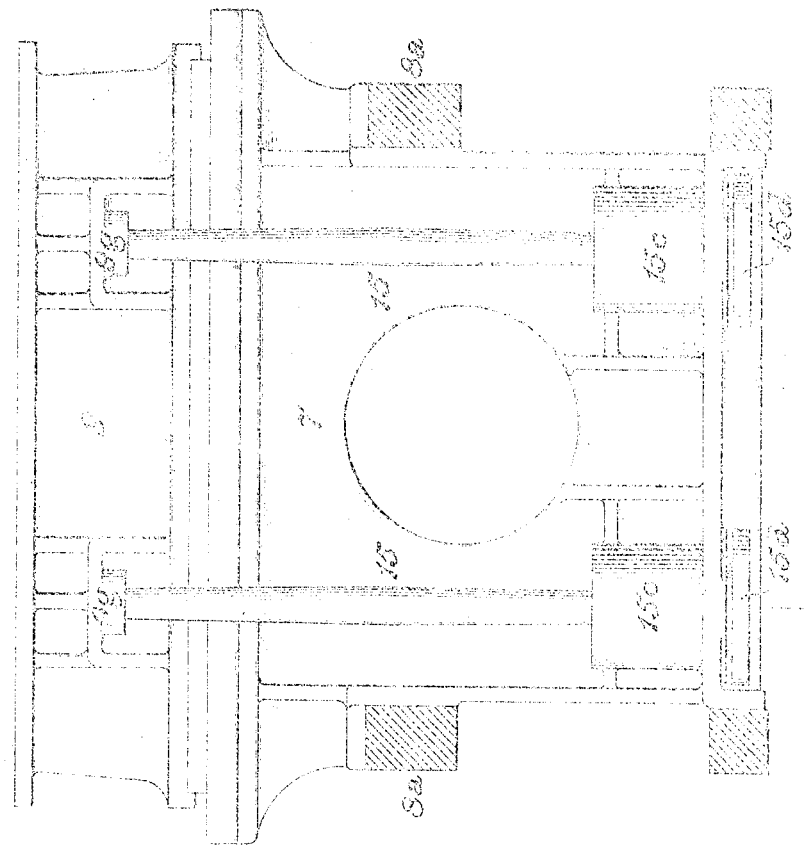
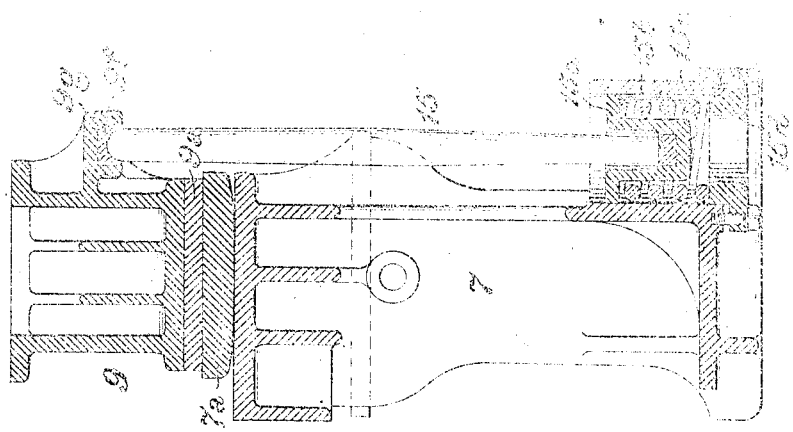

UNITED STATES PATENT OFFICE.

CARL J. MELLIN, OF SCHENECTADY, NEW YORK.

LOCOMOTIVE.

No. 852,444.  Specification of Letters Patent.  Patented May 7, 1907.

Application filed December 5, 1906. Serial No. 346,441.

*To all whom it may concern:*

Be it known that I, CARL J. MELLIN, of Schenectady, in the county of Schenectady and State of New York, have invented a certain new and useful Improvement in Locomotives, of which improvement the following is a specification.

My invention particularly relates to locomotives of what is known as the "articulated" type, the distinguishing characteristics of which are that the wheels are carried in a rear frame and in an independent front frame pivotally connected thereto by a center pin or pins, upon which it is free to swivel radially relatively to the rear frame, and that the boiler is attached rigidly to, and supported at its rear end on, the rear frame, and is supported, adjacent to its forward end, on the front frame, without being rigidly connected thereto, so that the latter has the capacity of lateral or swiveling movement independently of the boiler. Certain features of my invention are, however, not limited in application to locomotives of the above type, and may, without variation of structural or operative principle, be embodied in those of other known and approved constructions.

The objects of my invention are to provide effective and reliable means for supporting the boiler on the front frame and insuring the automatic adjustment of the bearing of the former on the latter in the relative movements of the frame and boiler; for centering the front frame relatively to the boiler in the passage of the locomotive from straight to curved portions of the track, and vice versa; for connecting the front and rear frames with the capacity of adjustment for proper balancing and alinement of the front and rear frames and the weight carried thereon; and, for connecting the reversing mechanism with the valve actuating mechanism.

The improvement claimed is hereinafter fully set forth.

Figures 2, 3:
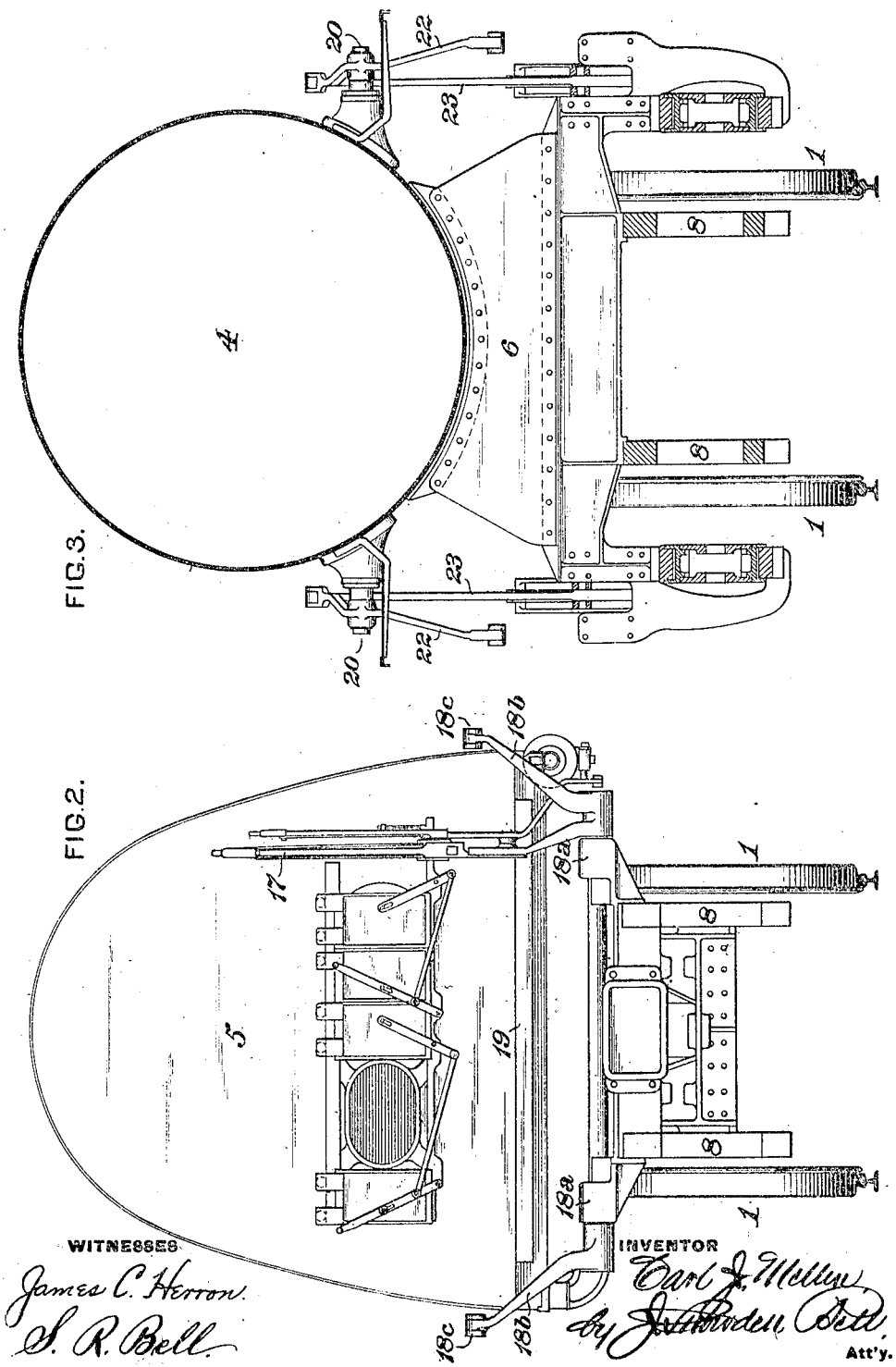
Figure 6:
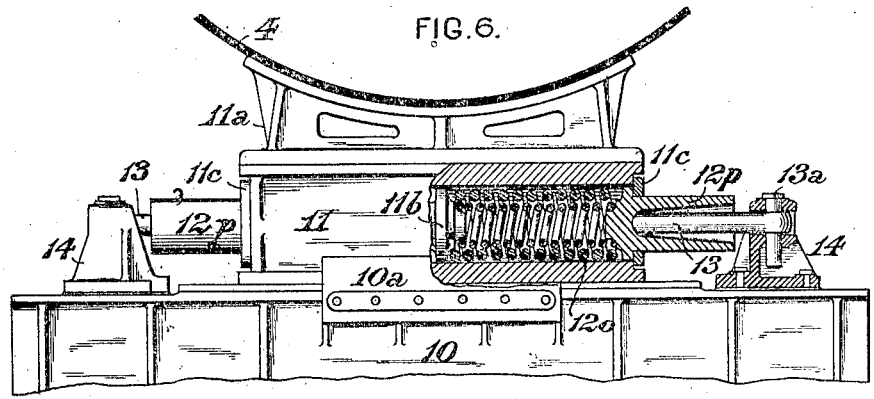
Figure 8:
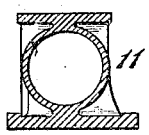
Figure 9:
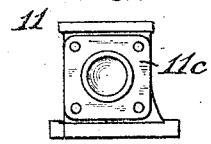
Figure 10:
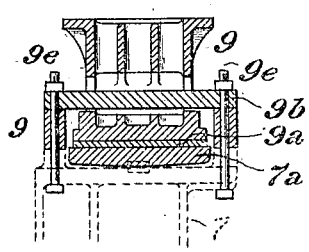
Figure 11:
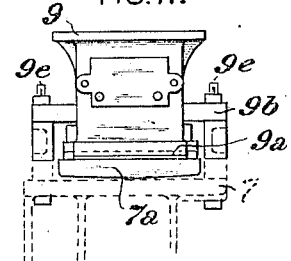
Figure 7:
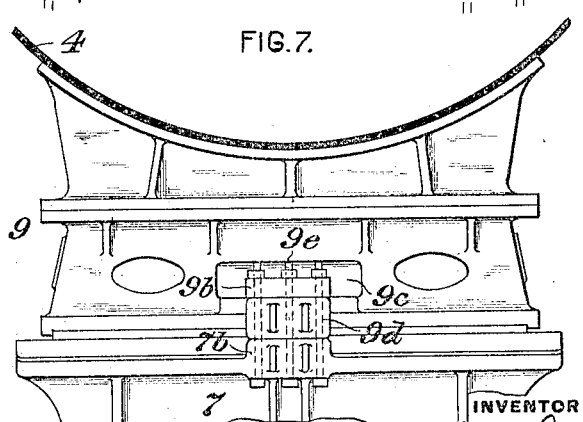

In the accompanying drawings: Figure 1 is a side view, in elevation, of a locomotive illustrating an embodiment of my invention, the connecting rods and their crank pins being omitted in order to avoid complication of lines; Fig. 2, a rear view, in elevation, and on an enlarged scale, the cab being omitted; Figs. 3, 4, and 5, transverse sections, on a similar scale, on the lines $aa$, $bb$, and $cc$, respectively, of Fig. 1; Fig. 6, a front view, partly in elevation and partly in section, of the centering mechanism; Fig. 7, a front view, in elevation, of the sliding bearing of the boiler and front frame; Fig. 8, a transverse section through the centering spring casing; Fig. 9, an end view of the same; Fig. 10, a transverse section through the self adjusting bearing plate of the boiler and front frame; Fig. 11, an end view of the same; Fig. 12, a vertical section through a spring casing of the floating device for reducing friction on the bearing plate, and a transverse section through said plate; Fig. 13, a front view, in elevation, of the floating device; Fig. 14, a plan view showing the manner of connecting the rear and front frames; and Fig. 15, a side view, in elevation, of the adjoining portions of the rear and front frames.

My invention is herein exemplified as applied in a four cylinder articulated compound locomotive, having a rear frame, 8, and an independent front frame, $8^a$, each of which is of the bar type, comprising an upper and a lower rail, and is provided with pedestals, in which the journal boxes of a set of driving wheels, 1, are mounted in the usual manner, there being, in this instance, six driving wheels carrying each frame.

The front and rear frames are pivotally connected by center pins, $8^b$, fitting, in line axially one with the other, and in the longitudinal central plane of the locomotive, in sockets secured to transverse braces, $8^c$, and $8^d$, on the members of the rear and the front frames, respectively. The boiler, 4, is secured rigidly to the rear frame, 8, its firebox, 5, being connected to the rear portion thereof by expansion braces, and its waist being connected to the rear frame by a guide brace, 6, and also being attached to the saddles of a pair of high pressure cylinders, $12^a$, secured to the rear frame at the front thereof. The forward portion of the boiler, 4, and its smoke box, $4^a$, are supported on the front frame, $8^a$, but are not rigidly connected thereto, so that the front frame has the capacity of swiveling movement, relatively to the rear frame and boiler, in the manner of a truck or bogie, in passing to, through, and from curves. A pair of low pressure cylinders, $12^f$, is secured to the front frame, near its forward end, and the driving wheels of the rear and front frames are rotated by connections from the pistons of the high pressure and the low pressure cylinders, respectively, in the ordinary manner. So far as above stated, the locomotive herein set forth accords generally with instances of the articulated type known and used in practical railroad service prior to my invention, the several features of improvement of which will now be described.

In order to support the forward portion of the boiler upon the front frame, with the capacity of free swiveling movement of said frame relatively to the boiler and automatic adjustment of the bearing of the latter upon the former, and to effect and control the automatic centering of the boiler and front frame, that is to say, the swiveling movements of the front frame from its normal position in line longitudinally with the boiler in passing from a tangent to a curve of the track, and into said normal position in passing from a curve to a tangent and the maintenance of the front frame in normal position while the locomotive is traversing tangent or straight portions of the track, as well as to prevent detachment or displacement of the boiler from its normal relation vertically to the front frame, the following mechanism is provided.

A substantial transverse bed plate or bearing support, 7, which performs the additional function of a transverse frame brace, is fitted between and firmly secured to the side rails of the front frame, 8ª, at any convenient point in its length, as, say, about one third thereof from its rear end, and a saddle or boiler support, 9, the upper face of which is internally curved to the radius of the boiler shell, and which, for convenience of construction, is preferably as shown, composed of an upper and a lower section, is secured to the boiler, 4, above the support 7. A self adjusting bearing plate, 7ª, is interposed between the support, 7, and the saddle, 9, said plate having its lower face, which rests on the top of the support, 7, convex or curved upon a comparatively long radius in transverse section, so as to be capable of a limited degree of rocking movement, as shown in Figs. 10, 11, and 12. The saddle, 9, and the portion of the weight of the boiler which it carries, are supported on the bearing plate, 7ª, preferably, as shown, through the intermediation of an interposed friction plate, 9ª, fitted in the lower face of the saddle. The bearing support, 7, and bearing plate, 7ª, while thus supporting the boiler and its connected saddle, are free to move laterally with the front frame, 8ª, relatively to the boiler and saddle, and, by the provision of the convex or curved lower face of the bearing plate, said plate is afforded the capacity of automatic or self adjustment to compensate for variations of the vertical relation of the front frame and boiler.

The self adjusting bearing plate, 7ª, can of course be inverted, if preferred, so that the saddle rests on the convex side, when both have some lateral movement, and the friction plate, 9ª, will then rest on the support, 7.

For the purpose of preventing the detachment or displacement of the boiler from the front frame, the saddle is coupled to the bearing plate by a connecting plate, 9ᵇ, which fits freely in a central opening or passage, 9ᶜ, in the saddle, and bears at its front and rear ends, on lugs, 9ᵈ, on the saddle, which lugs in turn, bear on similar lugs, 7ᵇ, on the bearing support. The connecting plate, 9ᵇ, saddle, 9, and bearing support, 7, are connected by bolts, 9ᵉ, passing through the lugs 9ᵈ, and 7ᵇ, and provided with suitable nuts, by which the saddle and bearing support are maintained in normal vertical relation without imposing resistance to their relative lateral movements in the swiveling of the front frame, 8ª.

The centering mechanism of the front frame is located at any convenient point between the supporting mechanism above described and the forward end of the frame, in this instance, below the smoke box, 4ª, of the boiler, and comprises the following members. A transverse abutment support, 10, which also serves as a transverse brace for the front frame, 8ª, is fitted between and firmly secured to the side rails of said frame, and a centering spring casing, 11, is fitted to move freely, transversely to the locomotive, above the support 10. The spring casing, 11, is secured to the lower side of a saddle or boiler seat, 11ª, which is internally curved at its top in correspondence with the boiler shell and is secured thereto. The vertical adjustment of the saddle and spring casing, relatively to the abutment support 10, and front frame, is such that the saddle and spring casing are free to move without contact of the spring casing with the support 10. A central abutment, 11ᵇ, is fitted freely in the spring casing, dividing the same longitudinally into two chambers, in each of which is located a centering spring, or pair of centering springs, 12ᶜ, the springs in the two chambers abutting at their opposite ends on the central abutment, 11ᵇ, and on followers, 12ᵖ, passing freely through end caps, 11ᶜ, fixed to the spring casing. Thrust rods, 13, which are in the form of rods, coupled at their outer ends, by pins, 13ª, to abutments 14, secured to the abutment support, 10, enter, and bear on the bottoms of, conical recesses in the followers, 12ª. Under the above construction, lateral movement of the front frame, 8ª, and connected abutment support, 10, in either direction relatively to the boiler, is resisted by the centering springs, 12, inasmuch as it effects their compression through the followers, thrust rods, and abutments, 11ᵇ, and 14. The centering springs consequently act to maintain the boiler and front frame in their normal position longitudinally in line on straight portions of the track; to impose a resistance which properly regulates the lateral movement of the front frame in passing from a straight to a curved portion of the track; and, by the release of such resistance, to automatically center or return the boiler and front frame to normal position in passing from a curved to a straight portion of the track.

For the purpose of providing an additional preventive against the vertical displacement of the boiler from its normal position relatively to the front frame, a plate, $10^a$, having a flange which fits over a lateral flange on the spring casing, may be secured to the spring casing support, 10.

As before stated, substantially all of the weight of the forward portion of the boiler is carried upon the front frame through the bearing support, 7, and bearing plate, $7^a$, and, in locomotives of comparatively great weight, it becomes desirable to effect a reduction of the friction between the bearing plate and the abutting surface of the saddle, 9, through which the weight is transmitted to the bearing plate. To this end, a "floating device" or elastic resistance mechanism, one specific embodiment of which is illustrated in Figs. 12 and 13, is provided, the leading and essential characteristic of said mechanism being means for relieving the bearing plate from a portion of the weight carried by the saddle, and transmitting the relieved portion of the weight to the front frame through a support which is independent of the bearing plate and which rests on the front frame through an interposed yielding or elastic bearing.

In the instance herein exemplified, the pressure of a portion of the weight carried by the saddle, 9, is relieved or released from the bearing plate, $7^a$, and the friction of the abutting face of the saddle thereon correspondingly reduced, by two vertical floating rod supports, 15, each having a spherical upper end bearing face, fitting a correspondingly recessed socket bearing, $9^f$, inserted in the lower side of a lug, $9^g$, which, in this instance, is shown as on one side of the saddle, 9, and bearing, at its lower end, on a follower, $15^a$, which is supported on a yielding or elastic resistance member, in this case a helical spring, $15^b$, fitting in a cylindrical casing, $15^c$, cast integral with the support, 7, or otherwise fixed to a suitable bed plate or bearing secured to the front frame, $8^a$. For convenience of construction, the bearing face of the spring casing, $15^c$, is formed on a separate sleeve, $15^d$, secured detachably to the bottom of the casing, which, however, is not essential. The construction described may, of course, be duplicated, if desired, independently of the support, 7, and saddle, 9.

It will be seen that by proper proportioning of the elastic resistance, the relief of weight and reduction of friction upon the bearing, $7^a$, may be effected to any desired degree, and it will also be clear to those familiar with locomotive construction, that the elastic resistance of fluid pressure, as air or steam, acting on the lower sides of the followers, $15^b$, they being, in such case, fitted with the ordinary packing, may be substituted for that of the springs selected for illustration, without departure from the spirit and operative principle of my invention.

Under certain circumstances, it may become necessary or desirable to balance and aline the front and rear frames vertically, and thereby to vary and adjust the relative proportions of weight carried by them, respectively, to which end, said frames, in addition to being pivotally connected, in the longitudinal central plane of the locomotive, by the pins, $8^b$, as before described, are provided with adjustable flexible connections, which permit the swiveling movements of the front frame, and are capable of adjustment to vary the vertical relation of the two frames and to maintain them in their adjusted vertical relation. One form of connections of such character, which has been found to operate satisfactorily in regular service, is shown in Figs. 14 and 15, referring to which, each side member of the rear frame, 8, is connected to the adjacent side member of the front frame, $8^a$, by a vertical bolt, 16, which passes through, and fits freely in, one of the rails (in this case the lower rail) of the rear frame, and one of the rails (in this case the upper rail) of the front frame. The bolts, 16, are fitted to the respective frame rails through the intermediation of flexible joints, formed by spherical faced washers, $16^a$, seated in corresponding sockets, $16^b$, in the frame rails, and are threaded at and adjoining each of their ends and provided with adjusting nuts, $16^c$, by which the washers of the upper and lower ends, and consequently the frame rails on which they bear, may be drawn toward each other or be permitted to be separated for a greater distance, as the case may be, to effect the desired relative vertical adjustment of the rear and front frames. By reason of the flexibility of the joints of the connecting bolts with the frame rails, the connections above described, permit, in any and all adjusted relative vertical positions of the two frames, the free swiveling movement of the front frame about the common axis of the coupling pins, $8^b$.

My invention is not, as to this feature, limited to the specific form of adjustable flexible connections selected for illustration and above described; which may be varied, as to structural detail, in the discretion of those skilled in locomotive construction, without departure from the spirit and operative principle of my invention. Thus, for example, the frame rails on each side may be connected by a loop or strap fitting transversely curved bearings on the frame rails and provided with adjusting screws bearing thereon by which the frame rails may be forced farther apart or be permitted to come more closely together, as the desired adjustment may require. Again, the connection may be effected by loops or straps bearing on the frame rails as last above described and drawn together or forced apart by a connecting bolt having right and left hand threads, in the manner of a turnbuckle, or right and left hand threaded bolts, engaging similarly threaded nuts, fitting spherical faced bearings in the frame rails, may be used. In each of these instances, the operative principle and the result will be the same as in the specific embodiment first described.

As previously noted, the locomotive is provided with a pair of high pressure cylinders, 12ª, secured to the rear frame, 8, and a pair of low pressure cylinders, 12ᶠ, secured to the front frame, 8ª, and the steam distribution of each pair of cylinders is effected by an independent valve actuating mechanism, which may be of any suitable and preferred type, and which, as it does not, in and of itself, form part of my present invention, need not be herein in detail set forth. Owing to the duplication of the valve actuating mechanism, as well as by reason of the weight of the moving parts thereof and of the reversing mechanism, it becomes essential to provide effective, reliable, and suitably balanced connections for the transmission of power from the reverse lever to the valve actuating mechanism. To this end, the reverse lever, 17, which may be operated either manually or by fluid pressure, is fixed upon one end of a transverse reversing shaft, 18, mounted in bearings below the foot plate, 19, of the locomotive, and carrying on each of its ends a reversing arm, 18ᵇ. Two high pressure lift shafts, 20, are fixed to the waist of the boiler, on opposite sides thereof and in line axially one with the other, above, and in proper relation to, the radius bars, 21, of the valve actuating mechanism of the high pressure cylinders, 12ª, and a bell crank or double armed lifting lever, 22, is journaled on each of the lift shafts, 20. The lower arms of the lifting levers, 22, are coupled by rear reach rods, 18ᶜ, to the reversing arms, 18ᵇ, and the upper arms of said levers are coupled by links, 23, to the radius bars 21, of the valve actuating mechanism, of the high pressure cylinders, which radius bars, through the connections above described, are raised and lowered as required for adjustment in forward or back motion and in the desired cut off positions. Two low pressure lift shafts, 20ª, are fixed to the boiler, on opposite sides thereof and in line axially one with the other, similarly to the high pressure lift shafts, above and in proper relation to the radius bars, 21ª, of the valve actuating mechanism of the low pressure cylinders, 12ᶠ, each of said shafts having journaled upon it a double armed lifting lever, 22ª. The lower arms of the lifting levers, 22ª, are coupled by forward reach rods, 18ᵈ, to the lower arms of the lifting levers, 22, and the upper arms of the lifting levers, 22ª, are coupled by links, 23ª, to the radius bars, 21ª, of the valve actuating mechanism of the low pressure cylinders, said radius bars being thereby moved coincidently with those of the high pressure cylinders, in accordance with the movements of the reverse lever, 17.

The construction last above described embodies the substantial practical advantages of locating the lift shafts in positions where they are conveniently accessible and are entirely clear of the side members and transverse bracing of the frame, and of transmitting the movements of the reverse lever to the valve actuating mechanisms through connections located on opposite sides of the boiler, thereby effecting a division of the application of power and obviating liability to straining or binding of the elements of the transmitting mechanism.

I claim as my invention and desire to secure by Letters Patent:

1. In a locomotive, the combination of a rear frame, a front frame pivotally connected thereto, wheels journaled in bearings in said frames, a boiler rigidly connected to the rear frame, a transverse bearing support fixed to the front frame, a bearing plate having a transversely curved or convex face and resting freely on the bearing support, and a saddle fixed to the boiler and resting on the bearing plate.

2. In a locomotive, the combination of a rear frame, a front frame pivotally connected thereto, wheels journaled in bearings in said frames, a boiler rigidly connected to the rear frame, a transverse bearing support fixed to the front frame, a bearing plate having a transversely curved or convex face resting freely on the bearing support and movable laterally therewith relatively to the boiler, and a saddle fixed to the boiler and resting on the bearing plate.

3. In a locomotive, the combination of a rear frame, a front frame, of bar construction, pivotally connected thereto, wheels journaled in bearings in said frames, a boiler rigidly connected to the rear frame, a transverse bearing support fixed to the front frame, a saddle fixed to the boiler and supported, with the capacity of independent lateral movement, on the bearing support, and means for preventing vertical displacement of the saddle from its seat on the bearing support.

4. In a locomotive, the combination of a rear frame, a front frame pivotally connected thereto, wheels journaled in bearings in said frames, a boiler rigidly connected to the rear frame, a transverse bearing support fixed to the front frame, a saddle fixed to the boiler and supported, with the capacity of independent lateral movement, on the bearing support, a connecting plate passing freely through the saddle, and bolts securing said connecting plate detachably to the bearing support.

5. In a locomotive, the combination of a rear frame, a front frame of bar form pivotally connected thereto, wheels journaled in bearings in said frames, a boiler rigidly connected to the rear frame, a transverse abutment support and frame brace fixed to the front frame, a spring casing secured to the boiler with the capacity of independent lateral movement, relatively to the front frame, centering springs extending longitudinally in the spring casing, followers fitting freely in the spring casing and abutting against the centering springs, abutments fixed to the abutment support, and tension members bearing, at the opposite ends, on the followers and on the abutments, respectively.

6. In a locomotive, the combination of a rear frame, a front frame of bar form pivotally connected thereto, wheels journaled in bearings in said frames, a boiler rigidly connected to the rear frame, a transverse abutment support and frame brace fixed to the front frame, a spring casing having the capacity of independent lateral movement relatively to the front frame and secured to the boiler, springs extending longitudinally in the spring casing, and means for effecting compression of said springs in and by the lateral movements of the front frame and connected abutment support.

7. In a locomotive, the combination of a rear frame, a front frame pivotally connected thereto, wheels journaled in bearings in said frames, a boiler rigidly connected to the rear frame, a transverse abutment support and frame brace fixed to the front frame, a spring casing secured to the boiler with the capacity of independent lateral movement relatively to the front frame, centering springs extending longitudinally in the spring casing, and means for effecting compression of said springs in and by the lateral movements of the front frame and connected abutment support.

8. In a locomotive, the combination of a rear frame, a front frame of bar form pivotally connected thereto, wheels journaled in bearings in said frames, a boiler rigidly connected to the rear frame, a transverse bearing support and frame brace fixed to the front frame, a saddle fixed to the boiler and supported, with the capacity of independent lateral movement, on the bearing support, a transverse abutment support and frame brace fixed to the front frame in advance of the bearing support a spring casing secured to the boiler with the capacity of independent lateral movement, relatively to the front frame, springs extending longitudinally in the spring casing, and means for effecting compression of said springs in and by the lateral movements of the front frame and connected abutment support.

9. In a locomotive, the combination of a rear frame, a front frame pivotally connected thereto, wheels journaled in bearings in said frames, a boiler rigidly connected to the rear frame, a transverse bearing support fixed to the front frame, a saddle fixed to the boiler and supported, with the capacity of independent lateral movement, on the bearing support, and a floating device or elastic resistance mechanism through which a portion of the weight of the saddle and boiler is transmitted to the front frame.

10. In a locomotive, the combination of a rear frame, a front frame pivotally connected thereto, wheels journaled in bearings in said frames, a boiler rigidly connected to the rear frame, a transverse bearing support fixed to the front frame, a bearing plate resting freely on the bearing support and movable laterally therewith relatively to the boiler, a saddle fixed to the boiler and resting on the bearing plate, and a floating device or elastic resistance mechanism through which a portion of the weight of the saddle and boiler is relieved from the bearing plate and transmitted to the front frame.

11. In a locomotive, the combination of a rear frame, a front frame pivotally connected thereto, wheels journaled in bearings in said frames, a boiler rigidly connected to the rear frame, a transverse bearing support fixed to the front frame, a saddle fixed to the boiler and supported, with the capacity of independent lateral movement, on the bearing support, a yielding or elastic member on the bearing support, bearings on the saddle, and vertical floating rod supports interposed between, and abutting on, the saddle bearings and the yielding resistance member.

12. In a locomotive, the combination of a rear frame, a front frame pivotally connected thereto, wheels journaled in bearings in said frames, a boiler rigidly connected to the rear frames, a transverse bearing support fixed to the front frame, a saddle fixed to the boiler and supported, with the capacity of independent lateral movement, on the bearing support, springs abutting on the bearing support, bearings on the saddle, and vertical floating rod supports interposed between and abutting on, the saddle bearings and the springs.

13. In a locomotive, the combination of a rear frame, a front frame, of bar form, pivotally connected thereto, wheels journaled in bearings in said frames, a boiler rigidly connected to the rear frame and supported, with the capacity of independent lateral movement, on the front frame, and adjustable means for vertically balancing and alining the front and rear frames.

14. In a locomotive, the combination of a rear frame, a front frame, of bar form, pivotally connected thereto, wheels journaled in bearings in said frames, a boiler rigidly connected to the rear frame and supported, with the capacity of independent lateral movement, on the front frame, and adjustable flexible connections interposed between the side members of the rear frames and the adjacent side members of the front frame.

15. In a locomotive, the combination of a rear frame, a front frame, of bar form, pivotally connected thereto, wheels journaled in bearings in said frames, a boiler rigidly connected to the rear frame and supported, with the capacity of independent lateral movement, on the front frame, vertically adjustable connecting members coupling the side members of the rear frames to the adjacent side members of the front frames, and flexible joints between said connecting members and the frame members.

16. In a locomotive, the combination of a rear frame, a front frame, of bar form, pivotally connected thereto, wheels journaled in bearings in said frames, a boiler rigidly connected to the rear frame and supported, with the capacity of independent lateral movement, on the front frame, vertical connecting bolts each passing through and fitting freely, at one end, in a rail of the rear frame, and, at the other end, in a rail of the front frame, spherical washers on the connecting bolts fitting corresponding sockets in the frame rails, and adjusting nuts engaging threads on the connection bolts and bearing on the frame rails.

17. In a locomotive, the combination of a reversing shaft journaled in bearings below the foot plate, a reverse lever fixed on said shaft, reversing arms on the ends of said shaft, two lifting levers for valve actuating mechanism, located on opposite sides of the locomotive, and reach rods connecting the reversing arms and lifting levers.

18. In a locomotive, the combination of a reversing shaft journaled in bearings below the foot plate, a reverse lever fixed on said shaft, reversing arms on the ends of said shaft, two lift shafts for valve actuating mechanism, fixed on opposite sides of the waist of the boiler, lifting levers journaled on said lift shafts, and reach rods connecting the reversing arms and lifting levers.

19. In a locomotive, the combination of a reversing shaft journaled in bearings below the foot plate, a reverse lever fixed on said shaft, reversing arms on the ends of said shaft, two rear lift shafts for valve actuating mechanism, fixed on opposite sides of the waist of the boiler, two forward lift shafts for valve actuating mechanism, fixed on opposite sides of the waist of the boiler, lifting levers journaled on the rear and forward lift shafts, rear reach rods connecting the reversing arms and the lifting arms of the rear lift shafts, and forward reach rods connecting the lifting levers of the rear lift shafts with those of the forward lift shafts.

CARL J. MELLIN.

Witnesses:
J. SNOWDEN BELL,
GEORGE H. SONNEBORN.